United States Patent [19]

Barrett et al.

[11] 3,964,586

[45] June 22, 1976

[54] CLUTCH DISC

[75] Inventors: Ronald Derek Barrett, Hockley; Michael Roi Howard, Brentwood, both of England

[73] Assignee: Ford Motor Company, Dearborn, Mich.

[22] Filed: July 2, 1973

[21] Appl. No.: 375,551

[52] U.S. Cl. ............... 192/107 C; 192/107 R; 192/106.1
[51] Int. Cl.² ............... F16D 13/60; F16D 69/00
[58] Field of Search....... 192/107 CP, 107 R, 106.1, 192/106.2, 107 M, 109 B

[56] References Cited
UNITED STATES PATENTS

| | | | |
|---|---|---|---|
| 2,107,741 | 2/1938 | Reed | 192/107 CP |
| 2,282,981 | 5/1942 | Jarrett | 192/107 CP |
| 2,333,308 | 11/1943 | Goodwin | 192/107 CP |
| 2,587,837 | 3/1952 | Goodwin | 192/107 CP |
| 3,587,803 | 6/1971 | Sugiura | 192/107 C |
| 3,696,902 | 10/1972 | Dantele | 192/107 C |

Primary Examiner—Samuel Scott
Assistant Examiner—Lance W. Chandler
Attorney, Agent, or Firm—Clifford L. Sadler; Keith L. Zerschling

[57] ABSTRACT

A clutch disc assembly comprises a pair of annular friction members each having an annular friction material layer bonded to an annular backing plate. The pair of friction members are secured in spaced apart relationship to an inner disc by segmentally shape corrugated leaf springs and rivets. The rivets are situated radially inwardly from the annular friction material layers so that the full thickness of the friction material may be used during the life of the clutch disc.

9 Claims, 4 Drawing Figures

CLUTCH DISC

BACKGROUND OF THE DISCLOSURE

This invention relates to a clutch disc assembly for a clutch used in conjunction with an automotive manual transmission.

Such clutch disc assemblies usually include annular layers of friction material. In a typical clutch, the clutch disc is splined to an output shaft and the annular layers of friction material are disposed between an engine flywheel and a pressure plate. Spring means are arranged to urge the pressure plate toward the flywheel so that the disc is driven by the flywheel.

SUMMARY OF THE DISCLOSURE

The present invention provides an improvement in conventional clutch disc constructions, and particularly in the method employed for securing the friction material in the disc assembly.

According to one embodiment of the invention, a clutch disc has the following features:
  a. a pair of friction members, each comprising an annular layer of friction material that is bonded to an annular backing plate, are disposed in back-to-back relationships;
  b. spring means are interposed between the backing plates; and
  c. the backing plates and the spring means are connected by rivets disposed radially inwardly of the inner periphery of the annular layers of friction material.

BRIEF DESCRIPTION OF THE DRAWINGS

The many objects and advantages of a clutch disc constructed in accordance with the present invention will become apparent upon consideration of the following detailed discussion and the accompanying drawings, in which.

DETAILED DESCRIPTION OF THE PREFERRED EMBODIMENTS

Figure 1:
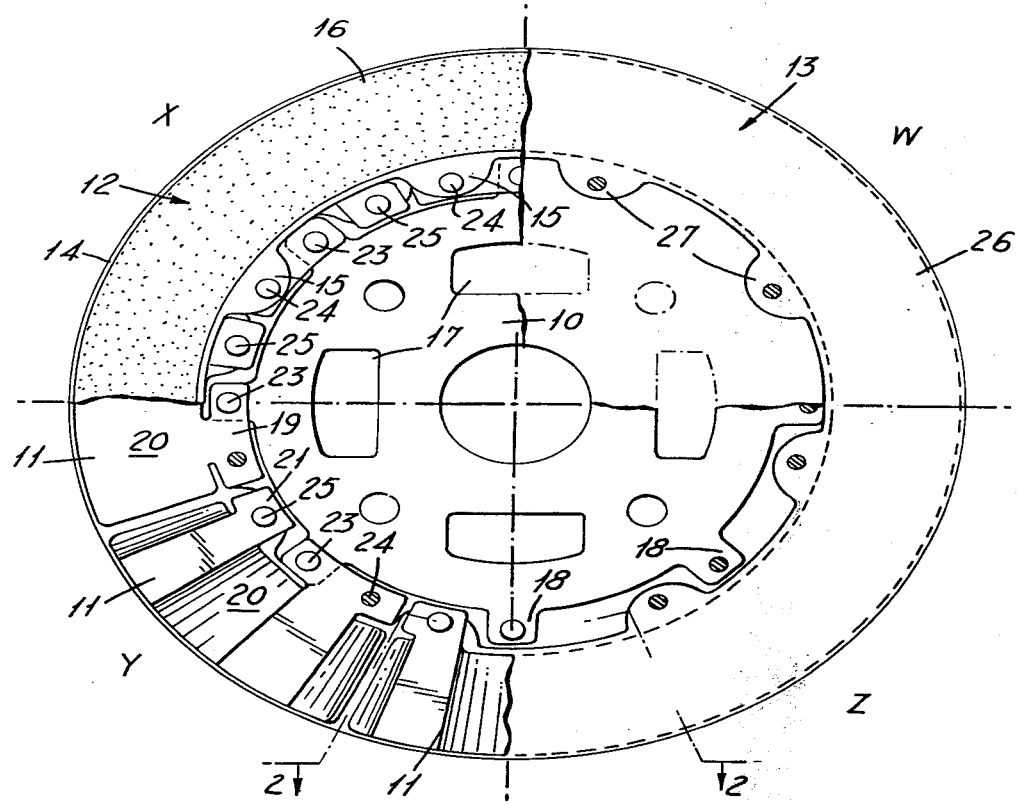
FIG. 1 is a front view of a clutch disc embodying the invention with portions of the assembly broken away to disclose the inner construction.
Figure 3:
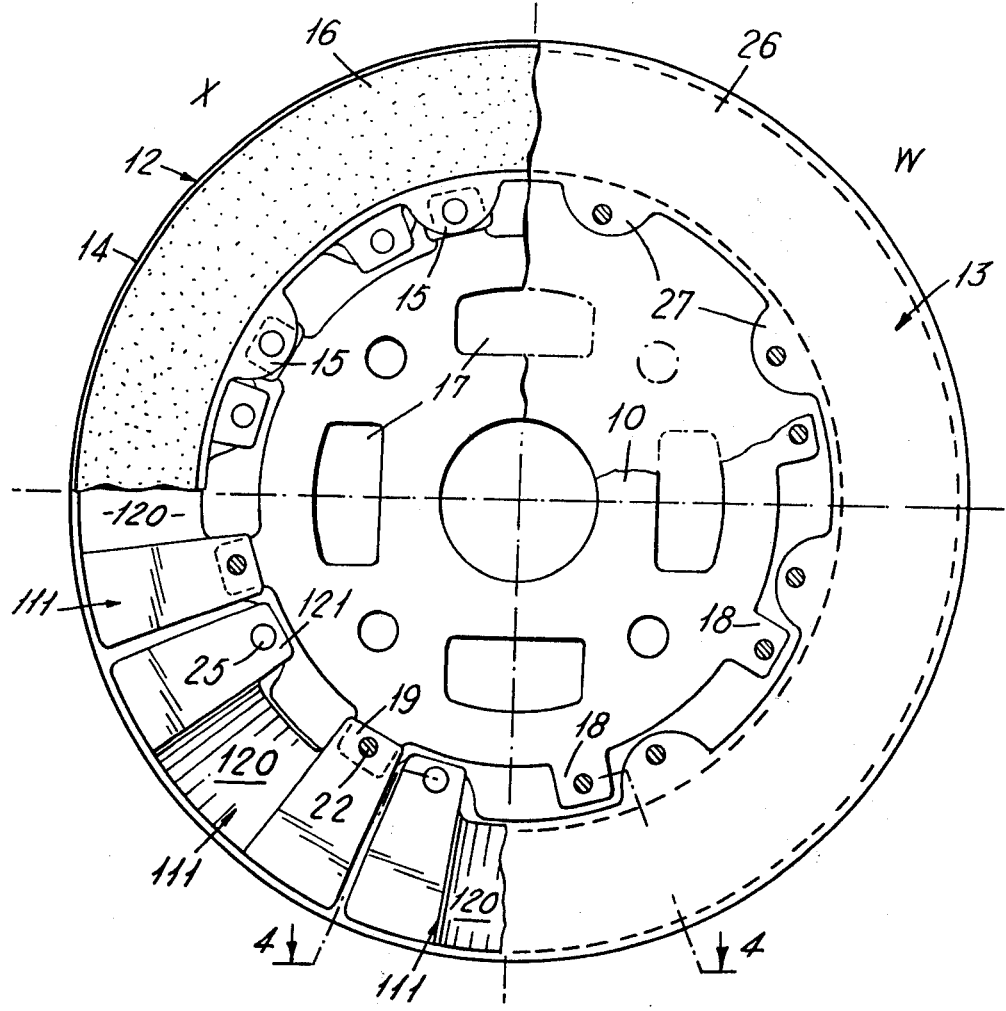
FIG. 3 is a front view of a clutch disc disclosing an alternate embodiment of the invention and with portions of the assembly broken away to disclose its inner construction.

The clutch disc of this invention are shown in FIGS. 1 and 3 with portions broken away to illustrate the inner construction of the disc assemblies. The broken away portions are arranged in segments. Segment X shows the complete disc assembly. Segment Y shows the disc assembly with the near friction member removed. Segment Z shows the assembly with both the near friction member and the leaf spring means removed. Segment W shows only the friction member on the far side of the assembly.

Figure 2:
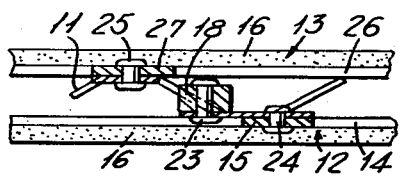
FIG. 2 is a schematic sectional view taken along section line 2—2 of FIG. 1.

Referring now to FIGS. 1 and 2, a clutch disc for an automotive diaphragm clutch assembly includes a flat spring carrier plate 10, a plurality of leaf springs 11 and two annular friction members 12 and 13.

The friction members 12 and 13 comprise flat metal backing plates 14 and 26 of generally annular shape with angularly spaced apart and inwardly projecting lugs 15 and 27. Annular layers of friction material 16 are adhered or bonded to the backing plates 14 and 26. The friction members 12 and 13 may be manufactured by the method described in our copending British patent application No. 61404/70.

The spring carrier 10 is of flat plate construction. It is mounted on a splined hub (not shown) and limited relative movement between the hub and the carrier 10 is cushioned by coil springs (not shown) accommodated in apertures 17 and damped by friction. The interconnection between the hub, the coil springs and the spring carrier plate 10 is conventional. The spring carrier 10 is formed with angularly spaced apart outwardly projecting lugs 18.

Each leaf spring 11 has a segmental shape body portion 20 from which an attachment tab 19 projects radially inwardly. The body portions 20 of the leaf springs 11 are each bent along radial lines at four spaced positions to form shallow corrugations. Each lug 18 of the spring carrier 10 is fixed to one end of the tab 19 of a respective leaf spring 11 by a rivet 23. The other end of each tab 19 is connected to an inwardly projecting lug 15 of the metal backing plate 14 by a rivet 24.

Each leaf spring 11 has a second inwardly projecting tab 21 spaced from its tab 19. The tab 21 is secured to an inwardly projecting lug 27 of the other metal backing plate 26 by a rivet 25.

Figure 4:
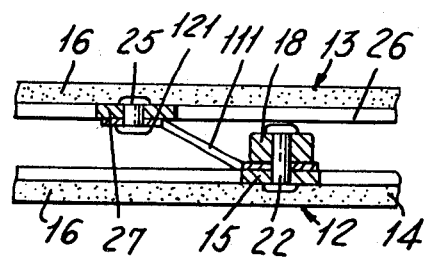
FIG. 4 is a sectional view taken along section line 4—4 of FIG. 3.

An alternate embodiment of the present invention is shown in FIGS. 3 and 4. The construction of this embodiment is similar to the construction of the FIG. 1 embodiment except as noted. The principal difference is in the configuration of the leaf springs. The leaf springs 111 have tabs 119 and each tab 119 is connected both to the carrier 10 and to the backing plate tabs 15 by a common rivet 22. In addition, the leaf springs 111 of FIGS. 3 and 4 are bent along two radial lines rather than four as in the embodiment of FIGS. 1 and 2.

OPERATION

In accordance with both embodiments of the present invention, annular friction members are provided which are interconnected with a spring carrier plate by means of leaf spring members and rivets. The rivets are disposed radially inwardy from the inner periphery of the friction facing of the friction members. This permits the full thickness of the friction material to be used during the life of the clutch disc. Each leaf spring 11 is bent at angularly spaced apart positions to form shallow corrugations effective to spring bias the friction members 12 and 13 apart.

When the clutch disc assembly is installed in a clutch, the disc is trapped between the flywheel and the pressure plate. Upon clutch engagement, the corrugated leaf springs 11 or 111 insure smooth engagement.

The foregoing description presents the presently preferred embodiment of this invention. Alterations and modifications may occur to those skilled in the art which will come within the scope and spirit of the following claims.

We claim:
1. A clutch disc constructed to be used in a vehicle clutch assembly,
    said clutch disc comprising a pair of annular friction members, said members each comprising an annular backing plate and a friction material facing affixed to said backing plate, a carrier constructed to be connected to a rotatable shaft, leaf spring means interposed between said backing plates, fastener means connecting said backing plates and said carrier to said leaf spring means, said fastener means including first rivet means securing one of said backing plates to said leaf spring means and second rivet means securing said carrier to said leaf spring means, said first rivet means and said second rivet means being disposed radially inwardly of and spaced apart from said friction material facing, said leaf spring means exerting a spring force urging the separation of said backing plates.

2. A clutch disc according to claim 1 and including:
said spring means comprising a plurality of circumferentially spaced apart individual leaf spring members.

3. A clutch disc according to claim 1 and including:
said spring means comprising a plurality of circumferentially spaced apart individual leaf spring members, each of said leaf spring members having a generally corrugated body portion.

4. A clutch disc according to claim 1 and including:
said spring means comprising a plurality of circumferentially spaced apart individual leaf spring members, each of said leaf spring members having a generally corrugated body portion, said body portions being constructed to engage the inner sides of said backing plates.

5. A clutch disc constructed to be used in a vehicle clutch assembly, said disc comprising a pair of annular friction members, said members each comprising an annular backing plate and a friction material facing affixed to said backing plate, a carrier constructed to be connected to a rotatable shaft, spring means operatively interposed between said backing plates and said carrier, said spring means comprising a plurality of leaf spring members, each of said leaf spring members having a segmental shape body portion, each of said body portions being bent along radially extending lines to form shallow corrugations, a plurality of tabs extending inwardly from each of said body portions, said backing plates each having a plurality of radially inwardly extending tabs, said carrier having a plurality of radially outwardly extending tabs, and fastener means interconnecting said leaf spring tabs, said backing plate tabs and said carrier tabs.

6. A clutch disc according to claim 5 and including:
two tabs extending inwardly from each of said body portions, one of said tabs of each of said body portions being connected to said tabs of one of said backing plates by a first series of rivets, the other of said tabs of each of said body portions being connected to said tabs of said other backing plate by a second series of rivets.

7. A clutch disc according to claim 6 and including:
a third series of rivets connecting said carrier tabs to said other tabs of said body portions, said third series of rivets being circumferentially spaced from said second series of rivets.

8. A clutch disc according to claim 6 and including:
said second series of rivets connecting said carrier tabs to said other tabs of said body portions.

9. A clutch disc constructed to be used in a vehicle clutch assembly, said disc comprising a pair of annular friction members, said members each comprising an annular backing plate and at least one imperforate friction material piece bonded to said backing plate, a carrier constructed to be connected to a rotatable shaft, leaf spring means operatively interposed between said backing plates and said carrier, said leaf spring means being bent along radially extending lines to form shallow corrugations and constructed to exert spring forces urging said friction members in spaced relationship, said leaf spring means having a plurality of radially inwardly extending tabs, said backing plates each having a plurality of radially inwardly extending tabs, said carrier having a plurality of radially outwardly extending tabs, fastener means connecting both said backing plate and said carrier to said leaf spring means, said fastener means including first rivet means securing the tabs of one of said backing plates to some of the tabs of said leaf spring means and second rivet means securing the tabs of said carrier to some of the tabs of said leaf spring means, said first rivet means and said second rivet means being disposed radially inwardly of and spaced apart from said friction material pieces.

* * * * *